W. O. BERKELEY, DEC'D.
I. M. BERKELEY AND T. T. HILL, ADMINISTRATORS.
REPOSITORY.
APPLICATION FILED SEPT. 4, 1920.

1,419,107. Patented June 6, 1922.

Wales O. Berkeley, Inventor.
By Ida M. Berkeley, and
Thomas T. Hill,
Administrators.

BY Victor J. Evans
ATTORNEY

WITNESS: J. W. Ely

UNITED STATES PATENT OFFICE.

WALES O. BERKELEY, DECEASED, LATE OF POTSDAM, NEW YORK, BY IDA M. BERKELEY, OF POTSDAM, NEW YORK, AND THOMAS T. HILL, OF CARMEL, NEW YORK, ADMINISTRATORS.

REPOSITORY.

1,419,107. Specification of Letters Patent. Patented June 6, 1922.

Application filed September 4, 1920. Serial No. 408,157.

*To all whom it may concern:*

Be it known that WALES O. BERKELEY, late a citizen of the United States, and a resident of Potsdam, State of New York, deceased, has invented new and useful Improvements in Repositories, of which the following is a specification.

This invention comprehends improvements in repositories, and relates particularly to a repository having a receptacle to receive soiled articles, such as sanitary napkins, diapers, and the like for the purpose of cleansing.

Another and more specific object of the invention resides in the provision of a repository having a receptacle closed at its upper end by a hinged wash basin; having an entrance passage extending upwardly and forwardly, and having means for injecting water into the receptacle.

Another object of the invention is to provide a repository having its entrance openings and its discharge openings tightly sealed so that there will be no escape of odors therefrom.

With these and other objects in view, the invention consists in the construction, combination, and arrangement of parts hereinafter set forth, and falling within the scope of the claims.

In the accompanying drawings:—

Figure 1:
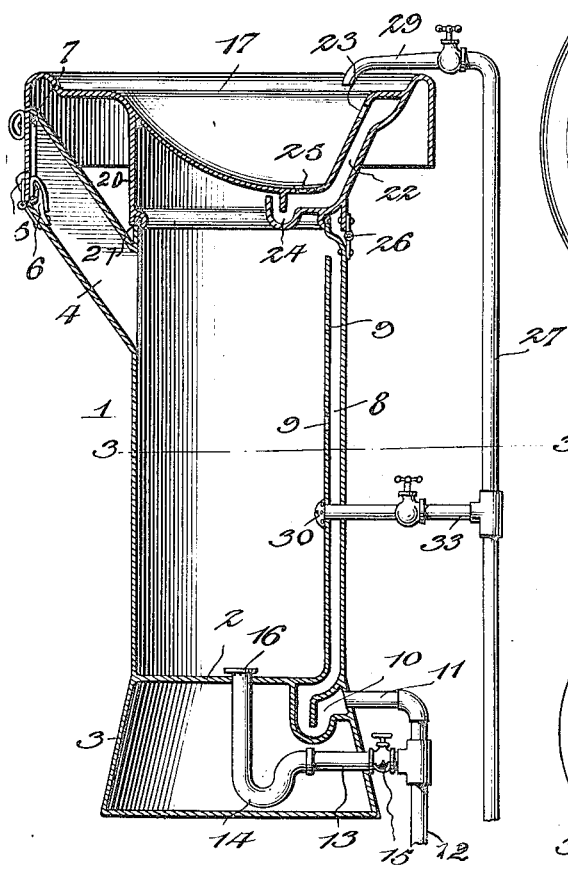
Figure 1 is a vertical sectional view through the repository.
Figure 2:
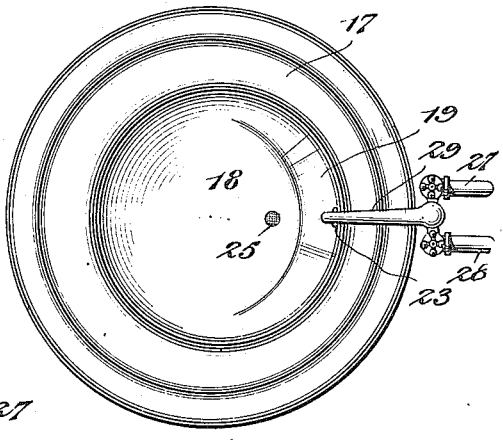
Figure 2 is a top plan view.
Figure 3:
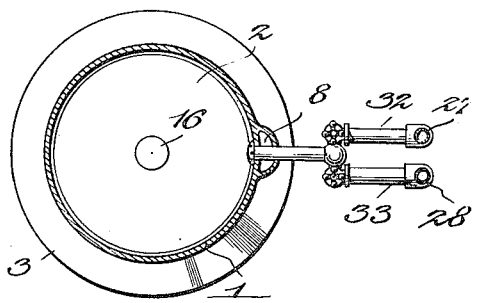
Figure 3 is a horizontal sectional view.

Referring in detail to the drawings by numerals, 1 designates a receptacle which is preferably cylindrical, which is open at its upper end, and which has its lower end closed by a bottom 2. A hollow base 3 supports the receptacle. Extending upwardly and forwardly from the side of the receptacle at a point slightly below its upper edge is an entrance passage or neck 4, which is closed by a door 5 secured to the neck by a spring hinge 6, or in any other preferred manner. A gasket 7 is interposed between the door 5 and the neck 4 to form an air tight seal. A discharge passage 8 is formed vertically along the rear of the receptacle and communicates with the interior thereof by the openings 9. The discharge passage 8 extends below the bottom 2 of the receptacle and has formed at its lower terminal a trap 10 from which leads a waste pipe 11 connecting with a main waste or discharge pipe 12. This latter pipe is connected with a waste pipe 13, which extends inwardly through the base 3 and which connects with the receptacle 2 through the bottom thereof. A water seal 14 is provided in the pipe 13 and a valve 15 is employed to open and close the passage through this pipe. To prevent an escape of articles from the receptacle into the pipe 13, a guard 16 is provided.

A wash basin 17 having a downwardly and rearwardly inclined bottom 18 and a rear wall 19 is disposed over and above the receptacle. This basin is provided with an encircling depending wall 20, which projects slightly into the top of the receptacle 1 and which engages the sealing gasket 21. An overflow passage 22 is formed at the rear of the wash basin and communicates with the interior thereof by means of openings 23. At the lower end of this overflow passage is formed a trap 24, which discharges into the receptacle 1. Openings 25 in the bottom of the wash basin permit its contents to drain directly into the trap 24. The basin is mounted on the receptacle by means of a hinge 26 and is so arranged that it may be swung upwardly to uncover the receptacle. It will be noted that any water which may be in the wash basin when it is raised will flow into the overflow passage 22 and when the basin is again lowered will discharge into the trap 24. Hot and cold water is conveyed to the wash basin by means of pipes 27 and 28 and discharges into the basin through a nozzle 29. It will be noted that the wash basin may be raised and lowered without any interference from these pipes. Water is fed directly into the receptacle 1 through a nozzle 30, which is connected to hot and cold water pipes 32 and 33.

Articles in the receptacle 1 may be agitated and cleaned by a supply of water from the nozzle 30, and if the valve 15 is left closed a quantity of water will always remain in the receptacle so that its contents may be left to soak.

From the foregoing description taken in connection with the accompanying drawing, it will be apparent that there is provided a very efficient and practical repository for use in cleaning soiled laundry, said repository being so constructed and designed that it is substantially air tight so that no odors may escape therefrom.

While there is herein shown and described the preferred form of the invention by way of illustration, it is desired to be understood that the invention is not limited or confined to the precise details of construction herein described and delineated, as modification and variation may be made within the scope of the claims and without departing from the spirit of the invention.

What is claimed is:—

1. A repository comprising a receptacle open at its upper end and closed at its bottom, a hollow base beneath the bottom of the receptacle, a trap located in said base, the receptacle having an over-flow passage communicating with the trap, a supply connection having a valved branch leading to the receptacle above said bottom, and a waste pipe having branches respectively opening to the receptacle, and to said trap.

2. A repository comprising a receptacle having an open top and a hollow base, means for sealing said open top of the receptacle, a trap located in said base, the receptacle having an over-flow passage leading to said trap, a valved supply connection leading to the receptacle and a waste pipe having a branch leading to the trap and a valved branch leading to the receptacle.

In testimony whereof we have affixed our signatures.

IDA M. BERKELEY,
THOMAS T. HILL,
As administrators of the estate of Wales O. Berkeley, deceased.